UNITED STATES PATENT OFFICE.

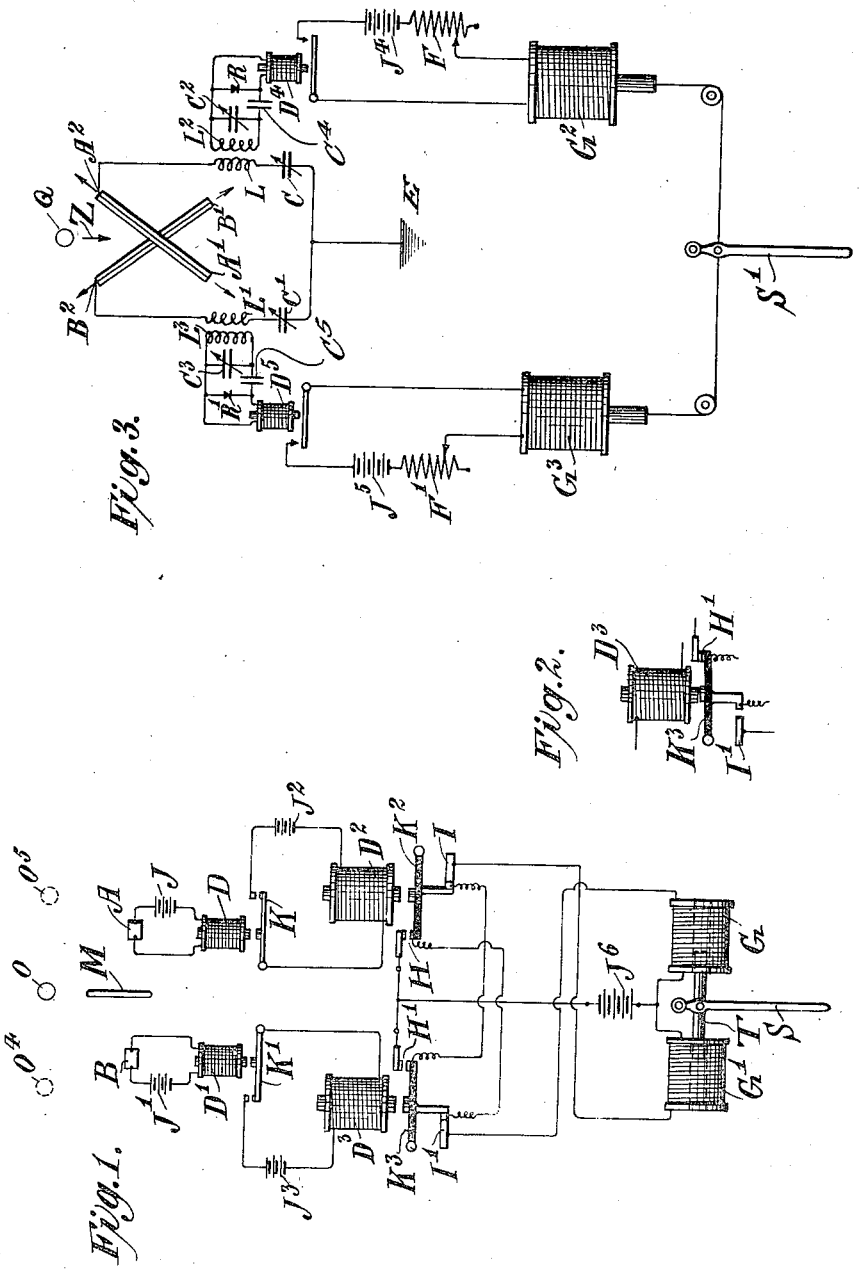

JOHN HAYS HAMMOND, JR., OF GLOUCESTER, MASSACHUSETTS.

SYSTEM OF RADIODIRECTIVE CONTROL.

1,387,850.   Specification of Letters Patent.   Patented Aug. 16, 1921.

Application filed June 7, 1912, Serial No. 702,174. Renewed January 18, 1921. Serial No. 438,260.

*To all whom it may concern:*

Be it known that I, JOHN HAYS HAMMOND, Jr., a citizen of the United States, residing at Gloucester, in the State of Massachusetts, have invented certain new and useful Improvements in Systems of Radiodirective Control, of which the following is a specification.

My invention relates to improvements in systems in which the movements of bodies or mechanisms are controlled or directed by radiant energy, such as light waves, radiant heat waves, ultra violet waves or electric waves. More particularly, my invention relates to methods and apparatus by which a movable body, such, for instance, as a boat, air craft, vehicle, or revolving lighthouse may be made to move or to face in the direction of a source of radiant energy.

In the present embodiment of my invention, the essential features are two receivers of radiant energy, which may be of any suitable form, such as selenium cells, bolometers, or directive electric wave receivers, according to the nature of the radiation which is to affect them. These receivers of radiant energy, by means of electrical and other apparatus, control the mechanisms which cause a movable body to face in certain directions, and they are so placed that when both are affected in approximately equal amounts by the radiant energy, the said movable body will face in a normal direction, say directly toward the source of energy, but when either receiver is more strongly affected by the radiant energy than the other, then the said apparatus and mechanisms will cause the movable body to face so that both receivers will be again equally affected.

Referring to the drawings:—

Figure 1 shows a receiving station, placed on a boat or other movable body, which contains receivers affected by light waves, these receivers, by means of electrical apparatus, controlling a steering or other mechanism.

Fig. 2 shows a key and other mechanism, forming details of Fig. 1, in another position.

Fig. 3 shows a receiving station which contains receivers affected by electric waves, these receivers, by means of electric apparatus, controlling a steering or other mechanism.

Figure 4:
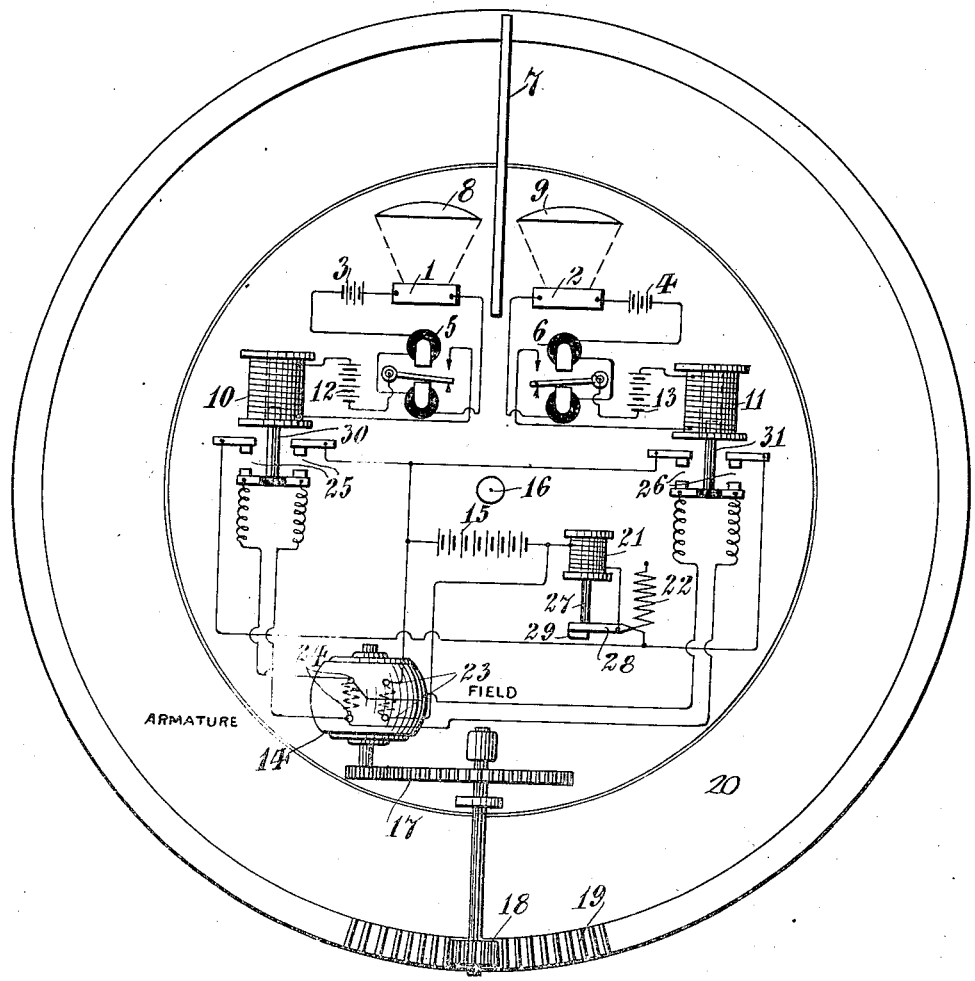
Fig. 4 shows a receiving station, with receivers susceptible to light waves, and mechanisms for causing a movable body to face a source of radiant energy.

In Fig. 1, O is a source of light. $O^4$ and $O^5$ show this source of light in other positions. A and B are receivers affected by light and preferably of the selenium type. M is an opaque screen. J and $J^{1'}$ are batteries and D and $D^1$ are electromagnets, in circuit, respectively, with the selenium receivers, A and B. K and $K^1$ are keys, controlled, respectively, by the electromagnets D and $D^1$, and in circuit, respectively, with the batteries, $J^2$ and $J^3$ and the electromagnets $D^2$ and $D^3$.

Key $K^2$ is controlled by electromagnet $D^2$, and when the latter is deënergized, $K^2$ makes contact at I and is in circuit with solenoid $G^1$. When $D^2$ is energized, $K^2$ makes contact at H and is in circuit with the solenoid G. Key $K^3$ is controlled by electromagnet $D^3$, and when the latter is deënergized, $K^3$ makes contact at $I^1$ and is in circuit with solenoid G. When $D^3$ is energized, $K^3$ makes contact at $H^1$ and is in circuit with solenoid $G^1$. Battery $J^6$ is connected with contacts H and $H^1$ and also with solenoids G and $G^1$. Solenoids G and $G^1$ have a common core T, which is normally in a central position, and which operates or controls the steering or other mechanism S.

As shown, receivers A and B and screen M have fixed positions with reference to each other and to the boat or other movable body on which they are placed. When the source of light O is in the position shown with reference to A and B, both receivers are illuminated, both electromagnets D and $D^1$ are energized, both keys K and $K^1$ are closed, both electromagnets $D^2$ and $D^3$ are energized, key $K^2$ makes contact at H and breaks contact at I, and key $K^3$ makes contact at $H^1$ and breaks contact at $I^1$. Consequently, circuits through both solenoids G and $G^1$ are open and core T and steering mechanism S remain in a central position.

If the source of light O moves to either side, or if the boat or other movable body, moves out of the direction O M S, either receiver A or receiver B will be shaded from O by the screen M. If, for instance, the source of light moves to the right, to the position $O^5$, or if the boat turns to the left, the screen M will shade receiver B. The resistance of B will therefore increase so that the current in the circuit B J¹ D¹ will be diminished until the relay D¹ is deënergized. The key K¹ will therefore open, the electromagnet D³ will be deënergized, and key K³ will break contact at H¹ and make contact at I¹. The circuit from battery J⁰ through contact H, key K², key K³, contact I¹ and solenoid G will be completed. Core T will therefore be drawn to the right, as will also steering mechanism S, and the boat will turn toward the right so as again to face the source of light, when both receivers A and B being again equally illuminated, the steering mechanism will resume its central position. If the source of light should move to the left, or the boat turn toward the right, the screen M would shade the receiver A, and the series of operations just described will take place in the other half of the apparatus, and the steering mechanism will be actuated so as to bring the boat again in a position facing the source of light.

In Fig. 2, the key K³ is shown in its position when electromagnet D³ is energized, and contact is made at H¹ and broken at I¹.

In Fig. 3, Q is a source of electric waves, and A¹ A² and B¹ B² are two directive receiving antennæ, which receive most efficiently when the source of radiant energy is in the direction A¹ A² and B¹ B², respectively. Both antennæ, however, will receive a certain amount of energy from Q in the direction Q Z. These antennæ are connected, respectively, with the coils L and L¹, and the variable condensers C and C¹, by which they can be tuned, and both are grounded at E. Coil L is inductively connected, by means of coil L², with the closed oscillatory circuit L² C². The rectifier R, with the stopping condenser C⁴, permits current impulses from this circuit L² C² to pass through the relay D⁴, which relay then closes the circuit J⁴ F G², comprising the battery J⁴, the variable resistance F and the solenoid G², and the core of the solenoid G² is attracted, thus operating the steering mechanism S¹. Coil L¹ is inductively connected with the circuit L³ C³, which, with the rectifier R¹, the stopping condenser C⁵, the relay D⁵, the battery J⁵, the resistance F¹, and the solenoid G³, all perform the same functions as the corresponding pieces of apparatus in the other half of the figure.

The resistances F and F¹ are made variable, so that the action of the solenoids on the steering mechanism can be easily adjusted. All this receiving apparatus is placed on a boat or other movable body, and when this receiving station is in the position shown in the figure, both receiving antennæ will be equally affected by the radiant energy from Q, and neither will be affected enough to cause the relays and solenoids to operate.

If the source of electric waves Q moves to the right, or the boat or receiving station turns to the left, antenna A¹ A² will receive more energy from Q and antenna B¹ B² will receive less energy.

The increased current in rectifier R will operate relay D⁴, circuit J⁴ F G² will be closed, and solenoid G² will attract its core and thus operate the steering mechanism S¹, so that the boat will be turned toward the right and again face the source of radiant energy Q. When this position has been regained, the energy received by antenna A¹ A² will be decreased so that the current through the rectifier R will no longer be capable of operating the relay D⁴, the current through the solenoid G² will be broken, and the steering mechanism will resume its normal central position.

If the source of electric waves should move to the left, or the boat turn toward the right, the antenna B¹ B² will receive an increased amount of energy, and the series of operations just described will take place in the other half of the apparatus, and the steering mechanism will be actuated so as to bring the boat again in a position facing the source of electric waves.

In the art, it is well known that in order to attain efficient tuning it is necessary to have circuits whose electrical oscillation is persistent and slowly dampened. Therefore, in all cases where I have shown detectors it may be understood that I may employ such detecting devices as present the least ohmic resistance in a circuit. Moreover, by means well known in the art, the interconnection of the oscillating circuits may be made to produce an amplification effect of the energy transmitted through them, rather than to suffer a direct loss due to the resistance of the circuits.

In Fig. 4 is shown another application of my invention for automatically keeping a body facing a source of radiant energy. Selenium cells 1 and 2 are connected in series with batteries and relays 3 and 5, and 4 and 6, respectively. 7 is an opaque screen, and 8 and 9 are condensing lenses. Relays 5 and 6 control solenoid switches 10 and 11 respectively. Batteries 12 and 13 are used to energize the solenoid switches as shown. The solenoid switches control a motor 14 and battery 15.

The apparatus as shown is mounted upon a turntable 20 pivoted at 16. The motor 14 is mechanically connected by reduction gearing 17 and pinion 18 to circular rack 19 in such a way that the turntable will revolve when the motor is actuated. Only a portion of circular rack 19 is shown in the drawing but it is to be understood that it goes all around the circle. 21 is a solenoid connected in series with the battery and resistance 22, the value of which resistance is determined by the position of contact finger 28. O¹ is a source of radiant energy, such as light.

The operation of the apparatus, as used with light waves, is as follows:—When selenium cells 1 and 2 receive illumination from O¹ through lenses 8 and 9, respectively, their resistances decrease and the relays 5 and 6 are operated by the increase in current flowing through them from the batteries 3 and 4 respectively. Relay 5 closes the circuit containing battery 12 and solenoid 10, thus energizing said solenoid and engaging the contacts at 25 by the attractive action of 10 on core 30. Relay 6 effects the closure of a circuit at 26, in a similar manner.

Motor 14 has its field terminals 23 connected to battery 15, and is therefore constantly energized. When the contacts at 25 and at 26 are engaged the motor armature terminals 24 are short circuited. The battery 15 is also shunted through solenoid 21. Under these conditions the circuit would run from the positive pole of battery 15 to the right hand contact 25, to the lower armature terminal 24, to the right hand contact 26, to the resistance 22, to the contact finger 28, to the solenoid 21, and to the negative pole of battery 15. Another circuit would run from the positive pole of battery 15 to the left hand contact 26, to the upper armature terminal 24, to the left hand contact 25, to the resistance 22, to the contact finger 28, to the solenoid 21 and to the negative pole of the battery 15. The purpose of 21 and 22 is to connect 22 in the battery circuit when the current exceeds the normal operating current required by 14. Thus when 10 and 11 are energized the battery is shunted through 21 and increased attraction for core 27 causes contact finger 28 to move upward, thus adding the resistance of 22 to the circuit, and thereby preventing excessive loss of energy from 15.

It is obvious that when selenium cells 1 and 2 are illuminated by O¹ the motor 14 will remain stationary, and 15 will be short circuited through 21 and 22. The resistance of 22 is of such value that the current passing through it does not greatly exceed the current required by the armature of 14 when in operation.

If now O¹ is moved to the position O², selenium cell 1 will be shaded, relay 5 and solenoid 10 will be deënergized, core 30 will move down, thus disengaging contacts 25, and the motor armature connections 24 and the battery 15 will no longer be short circuited. The motor will then revolve, core 27 will drop down to stop 29, and the turntable will rotate in a clockwise direction until the motor armature is again short circuited by the action of the illumination of 1 by O¹.

If O¹ moves to O³, selenium cell 2 will be shaded by 7 and solenoid 11 will be deënergized, the short circuit on the motor will be removed by the disengaging of contacts 26, motor 14 will rotate in a reversed direction, and turntable 20 will turn until 2 is again illuminated.

My invention is not confined to the particular apparatus or the particular kinds of radiant energy here shown, but may embody any apparatus or any form of radiant energy, which conforms with the principles of my invention.

I claim as my invention:—

1. In a system of radio control, a receiving station comprising a plurality of antennæ arranged to receive radiant energy in different degrees respectively, controlling devices respectively arranged to be rendered operative when said antennæ are simultaneously and equally exposed to radiant energy, a rudder, and means for actuating said rudder, said means being operative to shift said rudder in one direction or the other according as one or the other of said controlling devices is rendered inoperative by an unequal distribution of the received radiant energy upon said antennæ.

2. In a system of distant control, the combination with a body rotatable about a given axis, of means for rotating said body about said axis including an element carried by said body and responsive to a suitable series of impulses of electro-radiant energy transmitted from a given source distant from said body, a second element carried by said body and also responsive to the same series of impulses, said elements being so arranged upon said body and so constructed that normally said elements may be simultaneously and continuously exposed to said series of impulses throughout a period of time during which a relative rotation through a considerable angle takes place between said source and said body, and so that during said period said elements will simultaneously receive respectively from time to time different amounts of the energy of said impulses, the difference at any particular moment between the amount of energy received by one of said elements and the amount of energy received by the other of said elements being dependent upon the degree of relative rotation which has been effected between said body and said source at the said moment, and means arranged to be controlled by the conjoint action of said elements for rotating said body about said axis.

3. In a system of radio control, a receiving station comprising a plurality of directive antennæ arranged at angles to each other, said antennæ being adapted to receive electroradiant energy in different degrees depending upon the angles they make with a vertical plane containing the line joining the source of energy with the receiving station, detecting means connected to said antennæ for detecting electric waves, and means controlled by said detecting means and arranged to respond when any one of said antennæ receives an excess of electroradiant energy.

4. In a system of radio control, the combination with a movable body of two directive antennæ carried thereby each of said antennæ being adapted to receive radiant electric energy from a given source in a variable degree depending upon the orientation of said antennæ with respect to said source, and means actuated to move in one direction when an excess of said energy is received by one of said antennæ and to move in a different direction when a excess of said energy is received by the other of said antennæ.

5. In a system of radio control, the combination with a movable body of two directive antennæ carried thereby, each of said antennæ being adapted to receive radiant electric energy from a given source in a variable degree depending upon the orientation of said antennæ with respect to said source, and means actuated to move in one direction when an excess of said energy is received by one of said antennæ and to move in a direction opposite to said first named direction when an excess of said energy is received by the other of said antennæ.

6. In a system of radio control, the combination with a movable body, of a plurality of directive antennæ fixed thereon and arranged to receive electroradiant energy from a given source in different degrees respectively depending upon the relative orientation of said body with respect to said source, and means controlled by said antennæ for causing said body to be rotated either in a given direction or in a contrasting direction when said antennæ receives different amounts of electroradiant energy, the direction of rotation of said body depending upon which of said antennæ receives the greater amount of energy.

7. In a system of radio control, the combination with a body, of a plurality of directive antennæ carried thereby and arranged to respond in different degrees respectively to electroradiant energy from a given source depending upon the relative orientation of said body with respect to said source, an element controlled by and movable with respect to said antennæ and arranged to be moved either in a given direction or a contrasting direction as a result of the simultaneous reception of radiant energy by said antennæ, the direction of movement of said element depending upon which of said antennæ receives an excess of energy.

8. In a receiving system for radiant energy, the combination with a plurality of directive antennæ constructed and arranged to respond simultaneously to the same series of electroradiant waves from a given source in different degrees respectively depending upon the orientation of said receiving system with respect to said source, and means operatively connected to all of said antennæ and controlled thereby as a result of the simultaneous energization of said antennæ by said series of waves to produce at different times different effects depending upon the orientation of said antennæ with respect to said source.

9. The combination with a rotatable body, of a plurality of directive antennæ carried by said body and constructed and arranged to respond simultaneously to the same series of electroradiant waves from a given source, in different degrees respectively depending upon the orientation of said body with respect to said source and means operatively connected to and controlled by said antennæ as a result of the simultaneous energization of said antennæ by said waves for rotating said body with respect to said source.

10. The combination with a rotatable body, of a plurality of directive antennæ carried by said body and constructed and arranged to respond simultaneously to the same series of electroradiant waves from a given source, in different degrees respectively depending upon the orientation of said body with respect to said source, and means operatively connected to and controlled by said antennæ as a result of the simultaneous energization of said antennæ by said waves for rotating said body with respect to said source, either in one direction or in a contrasting direction depending upon the distribution of the energy of said waves among said antennæ.

11. In a receiving system for radiant energy, the combination with a plurality of directive antennæ constructed and arranged to respond simultaneously to the same series of electroradiant waves from a given source in different degrees respectively depending upon the orientation of said antennæ with respect to said source, and an element operatively connected to all of said antennæ and arranged to be controlled thereby as a result of the simultaneous energization of said antennæ by said series of waves so as to move said element either in one direction or in a different direction with respect to said antennæ depending upon the distribution of the energy of said waves among said antennæ.

12. The combination with a dirigible body provided with a rudder, of a plurality of directive antennæ carried by said body and constructed and arranged to respond simultaneously to the same series of electroradiant waves, and means controlled by said antennæ as a result of the simultaneous energization of said antennæ by said waves to move said rudder either in one direction or in an opposite direction depending upon the distribution of the energy of said waves among said antennæ.

This specification signed and witnessed this 11th day of May A. D., 1912.

JOHN HAYS HAMMOND, Jr.

Witnesses:
   MABEL J. COOPER,
   OLIVE B. KING.